United States Patent Office 2,963,464
Patented Dec. 6, 1960

2,963,464

THERMOPLASTIC, HIGH MELTING POLYSPIRANES

Saul M. Cohen, Springfield, and Edward Lavin, Longmeadow, Mass., assignors to Shawinigan Resins Corporation, Springfield, Mass., a corporation of Massachusetts No Drawing. Filed June 10, 1957, Ser. No. 664,451

7 Claims. (Cl. 260—67)

This invention relates to thermoplastic, high melting, crystalline condensation resins of the polyspirane type. More particularly, this invention relates to medium and higher molecular weight, linear condensates of dialdehydes or diketones with pentaerythritol or mixtures of pentaerythritol and dipentaerythritol.

Previous attempts to react pentaerythritol with dialdehydes have resulted in materials of low molecular weight and lower melting ranges. These have been amorphous, often viscous materials which were either monomeric spiranes or at most contained only a few spirane units. These low molecular weight condensates usually have been obtained as crosslinked insoluble, non-crystalline materials.

An object of this invention is to produce soluble resinous condensates of dialdehydes or diketones with pentaerythritol, or pentaerythritol and dipentaerythritol having a melting point of at least 200° C. A further object of this invention is to produce these resinous condensates having a molecular weight of at least 1,000.

These and other objects are attained by reacting (1) a material selected from the group consisting of (a) succinaldehyde glutaraldehyde, and mixtures thereof, (b) cyclopentanedial, cyclohexanedial, phthalic aldehydes and mixtures thereof, (c) mixtures of (a) and (b), (d) methyl and ethyl diacetals of malonaldehyde, succinaldehyde and glutaraldehyde, methyl and ethyl diketals of 2,4-pentanedione, 2,5-hexanedione and 2,6-heptanedione; and mixtures thereof. (e) methyl and ethyl substituted products of (a) and (d), and (2) a material taken from the group consisting of pentaerythritol and mixtures of pentaerythritol with dipentaerythritol, containing up to 25% dipentaerythritol by weight of the mixture, in the presence of trace amounts of acidic catalyst in an inert liquid which is a solvent for at least one of the monomers.

This invention is illustrated but not limited by the following examples in which the parts are listed by weight:

EXAMPLE I

*Preparation of poly(glutardiylidene pentaerythritol)*

|  | Parts |
|---|---|
| (a) Pentaerythritol | 400 |
| (b) Sodium lauryl sulfate | 70 |
| (c) Glutaraldehyde | 294 |
| (d) Distilled water | 2040 |
| (e) Hydrogen lauryl sulfate | 1.5 |

(a), (b), (c), and (d) were combined in that order in a 3-necked round-bottomed glass flask equipped with a motor-driven stirrer and reflux condenser and heated to reflux while stirring. (Foam was minimized by the addition of a few drops of an anti-foaming agent.) The reaction was initiated by the addition of (e) as soon as reflux was achieved. Polymerization commenced almost immediately, and, within minutes, tiny, cream-colored particles were visible on the flask walls. The reaction mixture was refluxed with stirring for 4.5 hours. At this time, 10 parts of 45 percent aqueous potassium hydroxide solution was added to the flask contents to terminate the reaction. Heating was discontinued, and the reaction mixture was permitted to stir for a further 10 minutes. Stirring was thereupon discontinued, and the reaction mixture was allowed to stand for 15 minutes. A major portion of the supernatant liquid then was decanted, and the rest of the reaction mixture was stirred into 10,000 parts of 1:1 by volume solution of methanol and water. This mixture was stirred for several minutes, then filtered through a Buchner funnel. The polymer collected was washed with excess 1:1 methanol-water solution until no more foam appeared in the washings. The product finally was dried for 18 hours at 55° C. under 50 mm. pressure in a circulating air oven.

The product consists of a cream colored-to-light tan powder of very fine granular structure. It begins to decompose at about 270° C. but does not melt at 300° C. Heated on the end of a spatula over a Bunsen flame, it fuses at a very high but undetermined temperature, indicating thermoplasticity. This polymer has proved to be insoluble in carbon tetrachloride, acetone, benzene, glacial acetic acid, ethylene chloride, and acetonitrile. However, it swells slightly in pyridine and in dimethyl sulfoxide. It is soluble in cresylic acid, and other phenolic solvents. This material is the reaction product of equimolar proportions of dialdehyde and pentaerythritol and has the following formula:

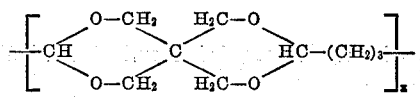

where x is about 10.

The molecular weight of the material in this example was 2,000. This was determined by standard procedure (end group analysis as described by Flory, J. Am. Chem. Soc. 58, 1877 (1936), and 61, 3334 (1939).

EXAMPLE II

*Preparation of poly(malondiylidene pentaerythritol) by transacetalization*

|  | Parts |
|---|---|
| (a) Pentaerythritol | 400 |
| (b) Dry benzene | 2200 |
| (c) Malonaldehyde, triethyl monomethyl diacetal | 605 |
| (d) p-Toluenesulfonic acid | 10 |
| (e) Cresylic acid | 4000 |

(a), (b), (c) and (d) were combined in that order in a 3-necked round-bottomed glass flask while stirring. The flask was equipped with a motor-driven stirrer, thermometer, dropping-funnel and a still-head with a connecting condenser. The reaction mixture was heated to a temperature of 80–83° C. Within 3 minutes, an azeotrope of benzene with the resulting methyl and ethyl alcohols produced began to distill slowly (B.P. 55–72° C.). After 2 hours, the theoretical amount of distillate was collected (1425 parts). The reaction mixture had turned from a deep yellow color to dark brown.

At this time, (e) was added to the reaction mixture along with a further 20 parts of (d). The reaction mixture was stirred at 85° C. for 1¾ hours while all the benzene plus any traces of alcohol remaining in the reaction mixture were distilled under a slight vacuum just sufficient to obtain a drop-wise rate of distillation. The distillate was collected in a flask cooled in acetone-Dry Ice, and the amount removed here amounted to 1030 parts. The reaction mixture was cooled and then treated with sufficient aqueous 45 percent potassium hydroxide solution to make the resulting solution yellow in color (complete neutralization). 60,000 parts of water were then added to the alkaline solution, while agitating vigorously, to precipitate the resin. The resulting solid was collected by filtration through a Buchner funnel. The solid was stirred into 10,000 parts of 1:1 methanol-water solution, thoroughly washed, and removed by filtration. The product was dried at 55° C. and 50 mm. pressure for 18 hours. The final product was a cream colored powder. When heated on the end of a spatula over an open flame, it fused at a very high but undetermined temperature. It possessed the following physical properties:

Thermoplastic
Melting point greater than 300° C. (no decomposition up to 300° C.)
Average molecular weight≃3300
Viscosity (20° C.) (7½% cresylic acid solution)— 62.8 cp.

EXAMPLE III

*Preparation of poly(glutardiylidene pentaerythritol) from an 88:12 mixture of pentaerythritol and dipentaerythritol*

This preparation was similar to that of Example I. However, 423 parts of a mixture of pentaerythritols were used, the mixture containing 88%, by weight, of the mixture, of monopentaerythritol and 12% of dipentaerythritol.

| Reaction Temp. | Reaction Time (Hrs.) | Polymer Conv. (Percent) | Polymer, M.P. (°C.) | Polymer Viscosity (7½ Percent Cresylic Acid Soln.) (Cp., 20° C.) |
|---|---|---|---|---|
| Reflux | 5.0 | 92 | >300 (Decomp. began at 269° C.). | 171.2 |

The product, in appearance and in most physical properties, was comparable to the resin previously prepared from 100 percent pentaerythritol in Example I. However, the viscosity of the cresylic acid solution was significally higher than that of the resin produced in Example I and films cast from solution onto glass or aluminum at 300° C. possessed better continuity, transparency, flexibility and adhesion.

As little as 12 percent dipentaerythritol substituted for monopentaerythritol in the resin yielded an improvement in film formation and adhesion with correspondingly little change in the original melting point and solubility characteristics.

The polymer produced had the following structural formula:

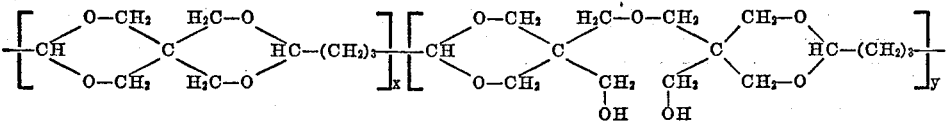

where x is about 9 and y is about 1.

EXAMPLE IV

The reaction of Example III was carried out in a similar manner, however, the dispensing agent was omitted. A 4-hour reaction time resulted in a 95% conversion. The resin had a molecular weight of 1200, a melting point of 208° C. and a 7½% solution in cresylic acid had a viscosity of 60 cp.

EXAMPLE V

*Preparation of poly(3-methylglutardiylidene pentaerythritol)*

The mixture of pentaerythritols (88:12) used in Example III and 3-methylglutaraldehyde were polymerized in equimolar proportions by direct condensation in a manner similar to Example I to give a white solid of fine particle size. This resin exhibited properties very different from its glutaraldehyde homologue. Thus the substituted resin possessed a lower melting range, lower solution viscosity, much higher molecular weight, and solubility in a wider range of solvents (such as pyridine and ethylene chloride) than the latter. Finally, films cast from cresylic acid at 230° C. onto glass or aluminum were continuous and transparent but were much softer than those from the unsubstituted resin.

| Reaction Temp. | Reaction Time (Hrs.) | Polymer Conv. (percent) | Polymer, M.P. (° C.) | Polymer Approx. Mol. Wt. (Avg.) | Polymer Viscosity (7½% Cresylic Acid Sol.) (cp., 20° C.) |
|---|---|---|---|---|---|
| Reflux | 4.08 | 98 | 205-8 | 9,000 | 65.8 |

The structural formula of the polymer produced was:

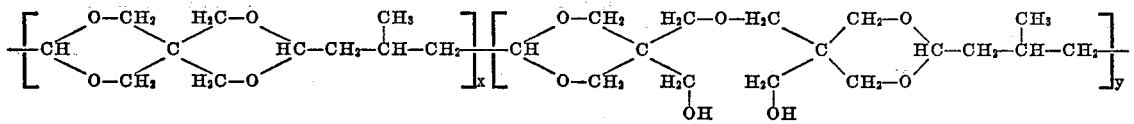

where x is about 34 and y is about 5.

EXAMPLE VI

A polymerization similar to Example IV was attempted using glyoxal as the dialdehyde. This attempted condensation yielded only an oil. Polymerization attempted with the aid of dispersing agents also yielded an oily product.

Transacetalization was also used in an attempt to produce a thermoplastic, high melting polymer with glyoxal. Equimolar proportions of the tetraethyl diacetal of glyoxal and an 88:12 mixture, by weight, of the pentaerythritols were mixed in benzene and reacted according to the method of Example III. A reaction time of 16 hours was required to react 64% of the monomers. The molecular weight of the final product was 200 and the viscosity of a 7½% cresylic acid solution was 40.0 cp.

J. Read reported in the Journal of the Chemical Society, 101, 2090-4 (1912) that heating pentaerythritol with glyoxal in 50% aqueous sulfuric acid produced a white powder insoluble in all the ordinary solvents as well as in boiling nitrobenzene or phenol. Such insolubility is indicative that the materials produced were cross linked rather than linear.

EXAMPLE VII

An attempt to polymerize pentaerythritol and α-hydroxy adipaldehyde by the condensation method described for glutaraldehyde in Example I gave no polymer. However, this result can be explained quite logically. By analogy with the structure of sugars, α-hydroxy adipaldehyde probably exists in actual fact as the following cyclic hemiacetal.

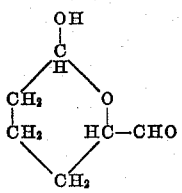

In such a form, one of its two aldehyde groups is probably not free to react here. This explanation is strongly supported by J. Read's findings (ibid.) which indicate that neither salicylaldehyde nor glucose react with pentaerythritol in the presence of aqueous sulfuric acid. He concludes that a hydroxyl group in a neighboring position to the aldehyde group exerts an inhibitory influence on the reactions of the aldehyde group. The above result supports this conclusion. The inhibition of the α-hydroxy adipaldehyde in these condensation reactions may be due to the aldehyde group being tied up by internal hydrogen bonding or by the formation of a hemiacetal structure.

EXAMPLE VIII

Attempts to polymerize pentaerythritol and 2,5-hexanedione in aqueous solution according to the methods of Examples I and IV were unsuccessful. Thus ketones appear to be reluctant to condense directly with pentaerythritol under these conditions.

EXAMPLE IX

*Preparation of poly(2,5-hexanediylidene pentaerythritol)*

Transketalization of pentaerythritol and 2,5-hexanedione tetraethyl diketal was accomplished by a method similar to that of Example II. The product was a brittle brown powder with a melting range of 225–238° C. The viscosity of a 7½% solution in cresylic acid at 20° C. was 51.8 cp. A tough, brown and transparent film was cast from this solution.

EXAMPLE X

A copolymer of equimolar parts of glutaraldehyde and 3-methyl glutaraldehyde with the 88:12 mixture of pentaerythritols was prepared by the method of Example III. A reaction time of 5 hours gave a 94% conversion, the polymer formed having a molecular weight of 5,500 and melting at above 300° C.

A similar attempt to form a copolymer with 30 (mole) percent of glyoxal and 70 (mole) percent of glutaraldehyde as the dialdehyde resulted in a polymer yield of 82% after 6 hours. The viscosity of a 7½% solution in cresylic acid was 82.0 cp. The viscosity of the equivalent glutaraldehyde polymer produced in Example III was much higher. This reaction was slow. The transacetalization with glyoxal diacetal in Example VI was even slower producing a very low molecular weight material. These experiments appear to indicate that the glyoxal has an inhibiting effect on the rate or extent of polymerization.

EXAMPLE XI

The reaction of 120 parts of the 88:12 mixture of pentaerythritols with 83 parts of glutaraldehyde in 565 parts of water (without the use of any dispersing agent) in the presence of 2 parts of oxalic acid resulted in a polymer with a molecular weight of over 1100 and a melting point above 200° C. This reaction was terminated without neutralization but merely by the addition of large amounts of water. The reaction time was 2 hrs. and the yield 97%. 7.4 parts oxalic acid gave similar results, as did 4 parts formic acid. However, the yield from the formic acid was only 85% after 2 hours. A 97% yield was obtained with 7 parts formic acid after 4 hours. In all cases solubility in cresylic acid occurred readily.

EXAMPLE XII

Similar reactions using a mixture of pentaerythritols containing 30 parts of monopentaerythritol and 10 parts dipentaerythritol, 26 parts glutaraldehyde and 188 parts water in the presence of 0.7 part of oxalic acid yielded the polymers of this invention. However, the use of a pentaerythritol mix containing 50% dipentaerythritol with p-toluenesulfonic acid as catalyst, and the use of a mix containing 95% dipentaerythritol with phosphoric acid as the catalyst yielded non-linear polymers insoluble in boiling cresylic acid.

The polymers of this invention are unique in that they are high melting, linear, thermoplastic materials of medium to high molecular weight formed by reacting dialdehydes, diacetals of dialdehydes, or diketals of diketones with about equimolar amounts of pentaerythritol or mixtures of pentaerythritol with dipentaerythritol. These polymers may be used in surface coating compositions and films may be cast from solutions at 200–300° C. They may be formed into solid products by molding or extrusion, alone or in combination with other resins. Linear polyspiranes may be used in their uncured form or they may be heat cured with a variety of cross-linking materials such as traces of inorganic acid, phenolic resins, epoxies, isocyanates, anhydrides, esters, polyvalent ions and others. These polymers are especially desirable in applications where high temperature resistance is needed along with films possessing good adhesion. The electrical insulating properties of these resins are outstanding. Although the materials produced were generally cream to tan colored, carefully controlled conditions have indicated that clear white products are obtainable.

In general, various aliphatic or cyclic dialdehydes may possibly be used to prepare the polymers of this invention. However, aliphatic dialdehydes of 6–7 carbons tend to cyclize and may therefore react unfavorably. In addition, polyspiranes with melting points of at least 200° C. have not been obtainable with aliphatic dialdehydes of 6 carbons or more. Glyoxal does not produce the polymers desired. The aliphatic dialdehydes used to prepare these polymers are therefore limited to malonaldehyde, succinaldehyde and glutaraldehyde, and methyl and ethyl substituted products thereof and mixtures thereof.

Cyclic dialdehydes may also be used. Cyclopentanedial, cyclohexanedial and ortho, meta and para phthalic aldehydes will produce the desired thermoplastic polymers having a melting point above 200° C. and a molecular weight of at least 1,000. Naphthylene dialdehydes and other polycyclic dialdehydes should also produce satisfactory products. Alkyl substituted products of cyclic dialdehydes tend to produce polymers having lower melting points. Saturated cyclic dialdehydes tend toward self condensation and are therefore preferably reacted in an aqueous system. The solubility of the cyclic monomers at the reflux temperature of an aqueous system is sufficient to enable the polymerization to procede rapidly.

Diketones do not react readily with pentaerythritol by themselves and are therefore used in the diketal form to produce these polymers by transketalization. The ketones used are limited to 2,4-pentanedione, 2,5-hexanedione and 2,6-heptanedione in order to insure producing polymers with melting points of at least 200° C. The polymers may be prepared similarly by transacetalization from dialdehydes in diacetal form. Mixtures of diacetals and diketals may be used. Some cyclic diketones may also be used but not all will produce high melting polymers. As in the case of the dialdehydes, side chain alkyl groups tend to decrease the melting point and crystallinity of the polymers formed. However, polymers with a melting point of at least 200° C. can be obtained from some methyl and ethyl substituted aliphatic diketones.

The formation of these resins is prevented if the dialdehydes or diketones contain various interfering reactive constituents such as active hydrogen atoms adjacent to the carbonyl groups. Any existing functional groups preferentially producing a different reaction must be avoided. Strong interference to the normal reaction is produced by the presence of hydroxyl groups adjacent to the carbonyl group. Materials, such as, α-hydroxy aldehydes and o-hydroxybenzaldehydes do not form the polymers of this invention under the conditions described. Materials such as malonaldehyde, adipaldehyde or pimelaldehyde, which are decomposed or self-condensing under certain conditions are not usable in an aqueous polymerization system. Malonaldehyde is therefore used in the form of an acetal derivative.

Polymers have been produced with the aforementioned dicarbonyl compounds and pentaerythritol as well as with mixtures of pentaerythritol containing up to 95%, by weight of the mixture, of dipentaerythritol. The use of some dipentaerythritol is highly desirable in that the film forming ability and adhesion of the films formed is better than that of polymers made with pentaerythritol alone. However, the dipentaerythritol is limited to 25% or less of the mixture in order to insure obtaining materials having a melting point of at least 200° C. Larger amounts of dipentaerythritol tend to decrease the crystallinity of the resins produced and, under the conditions described, may increase the chance of forming a brittle, insoluble, cross-linked material. Under milder conditions, including the use of weaker acids, it is possible to produce non-crosslinked polymers from mixtures containing as much as 25–95% dipentaerythritol. The use of some dipentaerythritol appears to cause a slower reaction in the processes described than with pentaerythritol alone. The presence of other polypentaerythritols such as tripentaerythritol will cause some cross-linking even under carefully controlled conditions. The tendency of an excess of certain dialdehydes to cause some cross-linking of the polymer chains is diminished by using a slight molar excess of pentaerythritol in the reaction.

The polymers of this invention produced with pentaerythritol have the following general formula:

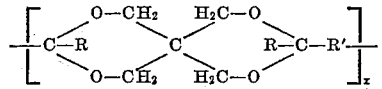

where R is taken from the group consisting of H and $CH_3$, R' is taken from the group consisting of aliphatic hydrocarbons of 1–3 carbon atoms and cyclic hydrocarbons of 5 and 6 carbon atoms, and $x$ is an integer from 5–50.

The polymers of this invention produced with mixtures of pentaerythritols have the following general formula:

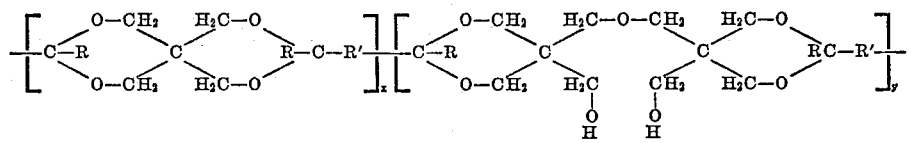

where R is taken from the group consisting of H and $CH_3$, R' is taken from the group consisting of aliphatic hydrocarbons of 1–3 carbon atoms and cyclic hydrocarbons of 5 and 6 carbon atoms, $x$ plus $y$ is equal to an integer from 5 to 50 and $y$ is an integer equal to no more than 25% of $x$ plus $y$.

The high melting polyspirane resins of this invention may be formed in an inert liquid which is a solvent for at least one of the monomers. An inert liquid is one which does not interfere with the polymerization reaction and may be water or an inert organic solvent. Faster reactions are possible if both monomers are soluble. One of the monomers may be only slightly soluble and yet react readily in the condensation. The solubility of pentaerythritol in benzene or of terephthalaldehyde in water is limited even at reflux but as the initial resin formed precipitates out of the system enough of the relatively insoluble monomer is dissolved or at least wet by the system to produce a fairly rapid reaction. The initial low molecular weight condensates produced are soluble in the system in which the monomer or monomers are dissolved. The resins are precipitated out of solution as higher molecular weights are attained. This molecular weight varies depending on the specific reactants and the reaction conditions but these molecular weights are not necessarily the maximum obtainable since the polymer chains will continue to grow somewhat as long as they are swelled by the monomer solvent system.

When molecular weights above about 2,000 are desired in an aqueous system it is necessary to add about 0.5–10%, by weight of the monomers, of a dispersing agent such as sodium lauryl sulfate to the system. These dispersants may be anionic, cationic or non-ionic surface tension depressants or wetting agents, such as alkali metal salts of long chain fatty acids, for example, potassium stearate; higher fatty alcohol sulfates, for example, sodium lauryl sulfate; polyethylene oxides, such as ethylene oxide derivatives of etherified or esterified polyhydroxy compounds, alkylphenoxy-polyethyoxyethanols; quaternary ammonium derivatives of alkyds or pyridine betaine types made from blends of fatty acids; and the like. Resins made for electrical insulating purposes are preferably prepared without the aid of dispersing agents in order to attain a maximum of insulating effectiveness.

These reactions are run at or about reflux temperatures in order to achieve maximum molecular weights and a reasonable conversion time. If an inert organic solvent is used, a boiling point of about 80° C. or higher is preferred since lower temperatures tend to produce products with molecular weights below 1,000. Solvents used for the transacetalization or transketalization systems should, in addition to the desirability of boiling at about 80° C. or above, possess the characteristic of forming a lower boiling azeotrope with the alcohol produced by the reaction. Benzene cyclohexane, methylcyclohexane, n-heptane are among the solvents possessing the desired requirements. The azeotrope is removed by distillation during the process in order to drive the reaction to completion. Of course, a high boiling solvent which allows the removal of the alcohols by distillation without any significant loss of monomers or solvent may also be used. The addition of a solvent for the polymers produced after a major amount of the transacetalization or ketalization has taken place will produce higher molecular weight polymers. These reactions may be conducted under pressure if higher temperatures are desired. An aqueous reaction conducted at 75° C. yields a molecular weight equal to only about ½ of that obtained at reflux temperature. Higher temperatures not only tend to increase the molecular weight produced but also decrease the reaction time.

The reaction may be terminated by neutralizing the catalyst with alkaline reagents, by cooling the system or by removing the precipitated product. The product should be washed carefully to remove as much contaminating catalyst as possible since acid catalysts are potential crosslinking agents when drying with heat. The presence of any other contaminating or reacting materials during polymerization is, of course, to be avoided. Other hydroxyl containing materials, such as cellulose, competing with the pentaerythritols for condensation with the dialdehydes will affect the structure of the polymers formed.

The concentration of the monomers in the solution or dispersion systems is not generally critical. The preferred concentration is about 10–100 parts of monomer to about 100 parts of solvent. Extremely dilute systems (such as 0.25 part monomer to 100 parts solvent) will not produce these linear polymers and concentrated systems such as about 180 parts or more of monomer per 100 parts solvent) may tend to produce reactions between some of the dialdehyde molecules.

As catalysts, trace amounts of any of the common strong acids are acceptable. Sulfuric, hydrochloric, p-toluenesulfonic, phosphoric, hydrogen lauryl sulfate, maleic, oxalic, formic acids and their acidic derivatives have been used. The preferred concentration of acids used ranges from 0.1 to 1.0% by weight of the monomers, depending on the strength of the acids used. Up to about 5% may be used satisfactorily. Of course, the use of larger amounts of acid increases the possibility of contaminating the product with adsorbed and occluded acid. Excessive concentrations of acids will tend to produce cross-linked materials even when drying at moderate temperatures.

The high melting polymers of this invention are readily soluble in cresylic acid and related alkyl phenols. However a limited number of other materials will dissolve and retain these polymers in solution with the aid of heat. These include dimethyl sulfoxide, 2-pyrolidone, tricresyl phosphite, furfuryl alcohol, a 1:1 mixture, by volume, of furfuryl alcohol with chlorobenzene, and certain liquid epoxy resins.

The linearity and crystallinity of these resins is shown by their solubility behavior and high melting points. Many of these materials may be melted and remelted without adverse effect. However, relatively slow heating to temperatures near their melting point may cause cross-linking and the resulting material produced is infusible and insoluble.

Linear polyspiranes have been produced having molecular weights of from 1,000 to 10,000 with melting points above 200° C. Polymers with melting points above 300° C. can be produced from unsubstituted dialdehydes having 3–4 carbon atoms. It has been found that alkyl and aryl substitutents in the dialdehydes and diketones yield polyspiranes of higher molecular weights.

What is claimed is:
1. Solid linear thermoplastic resins which are the polymeric reaction product under acidic conditions of about equimolar amounts of (1) a dialdehyde taken from the group consisting of at least one aliphatic dialdehyde containing 3–5 carbon atoms, 3-methylglutaraldehyde and mixtures thereof with (2) mixtures of pentaerythritol with dipentaerythritol containing from about 12 to 25% dipentaerythritol by weight of the mixture, which resins having the general formula:

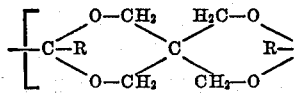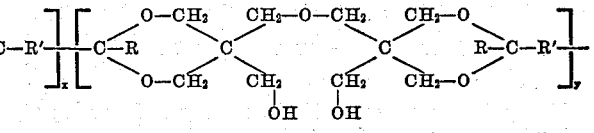

where R is taken from the group consisting of H and $CH_3$, R' is taken from the group consisting of 1–4 carbon atoms, $x+y$ is equal to an integer from 5–50 and the ratio $x/y$ is a number from 11.8 to 6.5 respectively, said resins having a molecular weight of about 1000 to 10,000 and a melting point of at least 200° C.

2. Solid linear thermoplastic resins which are the polymeric reaction product under acidic conditions of about equimolar amounts of glutaraldehyde with mixtures of pentaerythritol and dipentaerythritol containing from about 12 to 25% dipentaerythritol by weight of the mixture, which resins having the general formula:

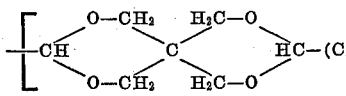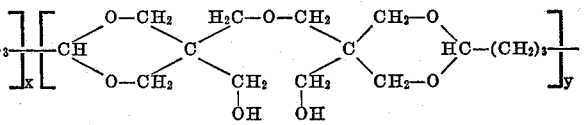

where $x+y$ is equal to an integer from 5–50 and the ratio $x/y$ is a number from 11.8 to 6.5 respectively, said resins having a molecular weight of about 1000 to 10,000 and a melting point of at least 200° C.

3. Solid linear thermoplastic resins which are the polymeric reaction product under acidic conditions of about equimolar amounts of 3-methylglutaraldehyde with mixtures of pentaerythritol and dipentaerythritol containing from about 12 to 25% dipentaerythritol by weight of the mixture, which resins having the general formula:

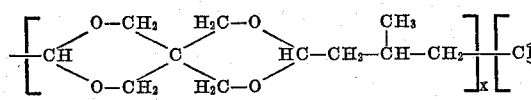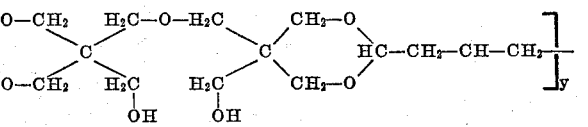

where $x+y$ is equal to an integer from 5–50 and the ratio $x/y$ is a number from 11.8 to 6.5 respectively, said resins having a molecular weight of about 1000 to 10,000 and a melting point of at least 200° C.

4. A process for preparing linear thermoplastic polyspiranes having a molecular weight of about 1000 to about 10,000 and a melting point of at least 200° C., said process comprising mixing about equimolar amounts of (1) a dialdehyde taken from the group consisting of at least one aliphatic dialdehyde containing 3–5 carbon atoms, 3-methylglutaraldehyde and mixtures thereof, (2) mixtures of pentaerythritol with dipentaerythritol containing from about 12 to 25% dipentaerythritol by weight of the mixture; in an inert liquid which is a solvent for at least one of the monomers, the total amount of monomer being from about 10 to 100 parts monomer per 100 parts of inert liquid, stirring and heating at about 75 to 100° C. in the presence of 0.1 to 1% by weight of the monomers of acidic catalyst, removing the precipitate formed, washing and drying.

5. A process as in claim 4 wherein the inert liquid is water.

6. A process as in claim 5 wherein about 0.5–10% by weight of the monomers, of a dispersing agent taken from the group consisting of anionic, cationic and non-ionic surface tension depressants is included in the water.

7. A process for preparing linear thermoplastic polyspiranes having a molecular weight of about 1,000 to about 10,000 and a melting point of at least 200° C., said process comprising dissolving about equimolar amounts of (1) a dialdehyde taken from the group consisting of at least one aliphatic dialdehyde containing 3–5 carbon atoms, 3-methylglutaraldehyde and mixtures thereof, (2) mixtures of pentaerythritol with dipentaerythritol containing from about 12 to 25% dipentaerythritol by weight of the mixture; in an inert organic solvent for the monomers with a boiling point of at least 80° C., stirring and heating at reflux in the presence of 0.1 to 1% by weight of the monomers of acidic catalyst, until polyspiranes having a molecular weight of at least about 1000 are produced, precipitating the polyspirane, washing and drying.

References Cited in the file of this patent

UNITED STATES PATENTS

| | | |
|---|---|---|
| 2,739,972 | Abbott et al. | Mar. 27, 1956 |
| 2,785,996 | Kress | Mar. 19, 1957 |
| 2,889,290 | Capps | June 2, 1959 |